UNITED STATES PATENT OFFICE.

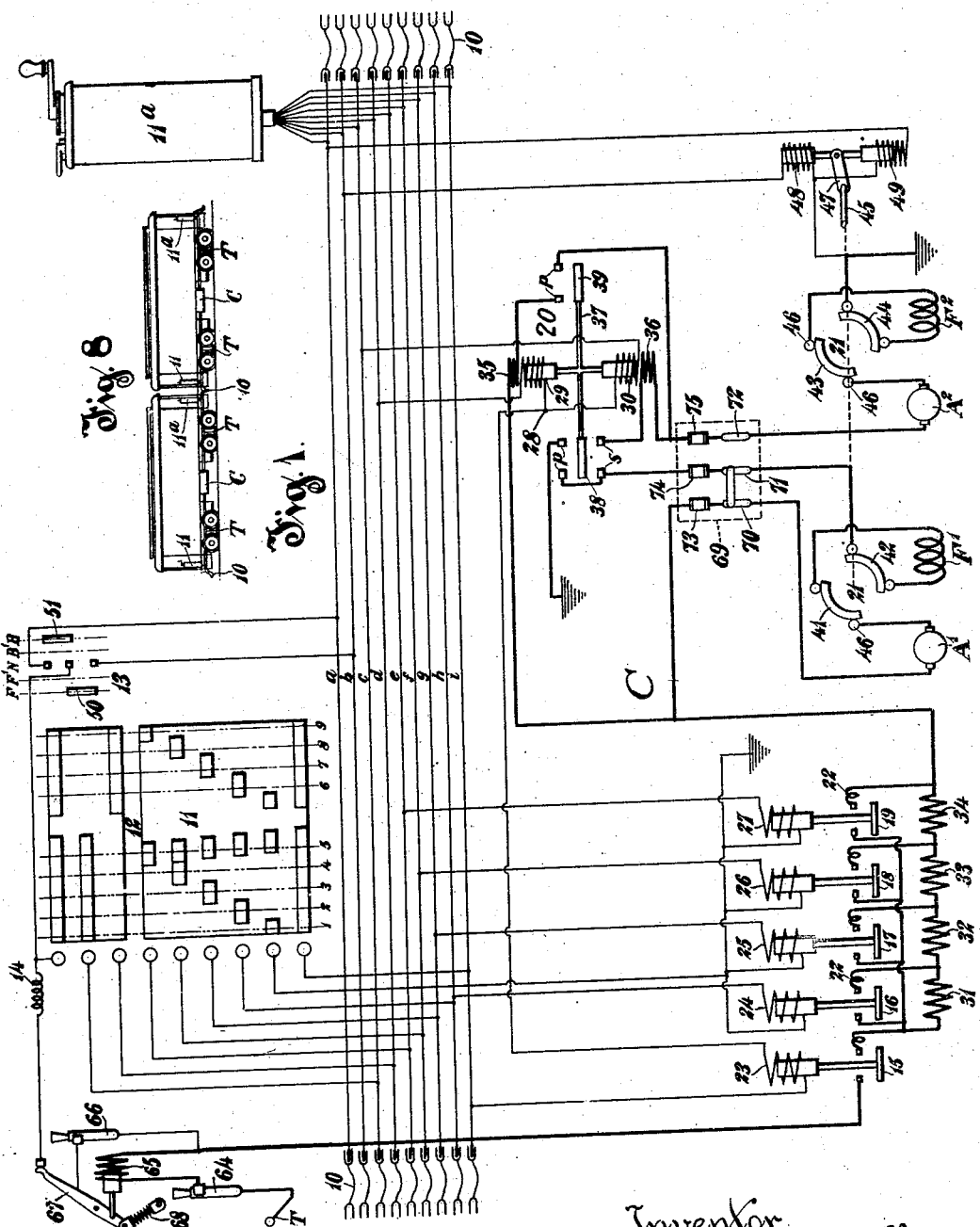

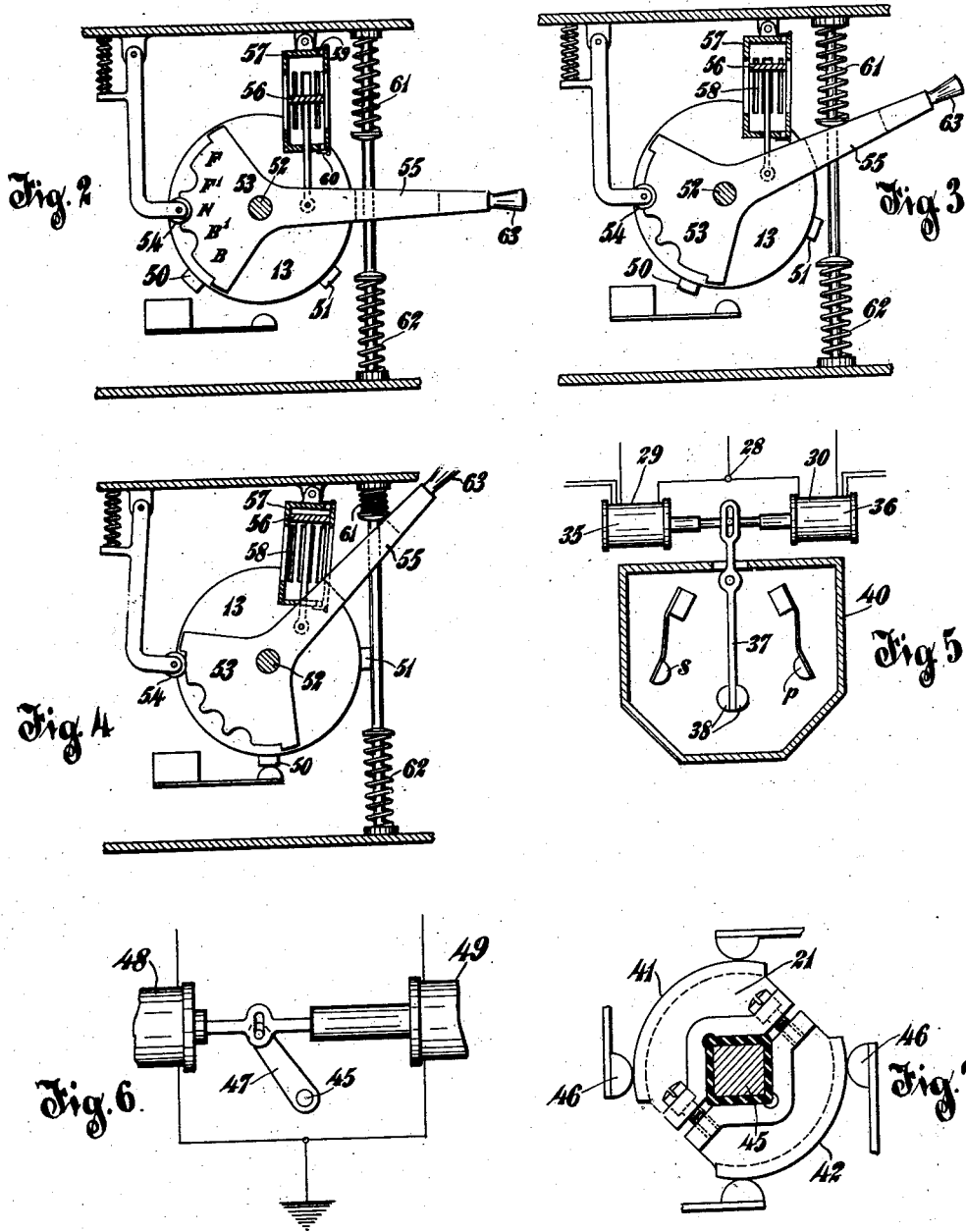

EMMETT W. STULL, OF NORWOOD, OHIO, ASSIGNOR TO ALLIS-CHALMERS COMPANY, A CORPORATION OF NEW JERSEY, AND THE BULLOCK ELECTRIC MANUFACTURING COMPANY, A CORPORATION OF OHIO.

MOTOR-CONTROL SYSTEM.

No. 916,898.     Specification of Letters Patent.     Patented March 30, 1909.

Application filed December 31, 1906. Serial No. 350,119.

*To all whom it may concern:*

Be it known that I, EMMETT W. STULL, a citizen of the United States, residing at Norwood, in the county of Hamilton and State of Ohio, have invented certain new and useful Improvements in Motor-Control Systems, of which the following is a full, clear, and exact specification.

My invention relates to systems of motor control, and especially to those train control systems in which a number of separable units may be controlled from any desired point on the train.

It often happens that a short-circuit or other similar trouble occurs in one of the motors of a car. This in the control systems now in use causes the main circuit-breaker to open and thereby cuts out all the motors of that car until the disabled motor has been properly cut out. Often it is difficult to determine which is the disabled motor. In my invention I aim to overcome these difficulties by having a fuse or other circuit-breaker for each motor, this fuse being of such carrying capacity that in case of an overload on that particular motor alone, the fuse of that motor will blow and the other motors will continue in service, at least in certain positions of the controller. Moreover I arrange these fuses or circuit-breakers on the same supporting plate with a set of cut-out switches, one for each motor, and in such relation to the cut-out switches that the blowing of the fuse of one of the motors indicates which of the cut-out switches should be opened. This supporting plate is preferably located in some accessible but unexposed place, as beneath the car between the two trucks.

Another object of my invention is to so arrange certain switches of the controlling system that they will close simultaneously and open successively. This is especially advantageous for localizing the arcing at one switch. By arranging the switches to operate in this manner I can connect their operating means in series and avoid the use of one or more train wires. The switches which I have arranged to operate in this manner are the circuit-closing switch and the series-parallel switch.

Another object of my invention is to diminish the loss of energy in operating the motor-reversing switch. This I accomplish by providing a master reversing switch which controls said main reversing switch and which upon being moved to either operative position remains there only for a predetermined time after being released by the hand of the operator, then moving to an indicating position corresponding to the operative position which it has just left. Furthermore, in the train control systems now in use it is customary to have interlocks between the switches which connect the motors of any one unit of the system in series and the switches which connect them in parallel. As these interlocks are often sources of trouble, I aim in my present invention to avoid this trouble by arranging the connections so that the same switch in different positions connects the motors in different relations. It is also customary in train control systems to have a circuit-breaker for opening the main circuit in case of an overload thereon. As this circuit-breaker is generally mounted on the motorman's platform so as to be readily accessible, and as it carries the full motor current, the arcing which occurs when it is opened is startling to the passengers and perhaps dangerous as well.

My present invention provides a system in which an overload on the main circuit incapacitates the master controller, thereby causing the main controller to open the circuit. This circuit opening takes place at the regular circuit making and breaking switch or switches of the main controller where provision for suppressing arcing is already made. Thus a main overload circuit-breaker with special arc-extinguishing means is unnecessary. Moreover, no arcing takes place in view of the passengers.

Many other features of my invention will be specifically described and shown in the description and drawings and will be particularly pointed out in the claims.

Figure 1 is a diagrammatic view showing the application of my invention to one of the cars or units of a train control system. Fig. 2 is a plan view of the master reversing switch in neutral position. Figs. 3 and 4 are views showing this switch in indicating and operating positions respectively. Fig. 5 is a sectional view of the series-parallel switch. Fig. 6 is a partial view of the operating means for the main reversing switch; Fig. 7 is a partial view of the main reversing switch; and Fig. 8 represents diagrammatically a train of two cars equipped with my improved control system.

In the drawings, $a$ to $i$ represent train wires of my improved train control system. In the drawings these wires are shown as extending throughout the length of one car only. If several cars are coupled to form a train, the train wires of each car may be joined to corresponding train wires of the adjacent cars by connectors 10 of any desired type. From the train wires $a$ to $i$ lead other wires which extend to the master controllers 11 and $11^a$ and the main or motor controller C. In Fig. 1 the master controllers are shown above the train wires while the motor controller together with the motors $A^1$ and $A^2$ to be controlled are shown below the train wires. A master controller is shown at each end of each car, one being in elevation and one in diagram. These two master controllers are identical in structure, and only one will be described in detail.

The master controller 11 consists of a main controlling drum 12 and a reversing switch 13, both shown in development. A blow-out magnet 14 may be provided, this blow-out magnet being preferably arranged in any well known manner so that it serves to suppress arcing at both the main drum and the reversing switch of the master controller. The main drum of the master controller has operative positions 1 to 9 inclusive. The first five of these positions control the series connection of the motors $A^1$ and $A^2$, while the last four control the parallel connection of said motors.

The main motor controller C consists of a circuit closing switch 15, resistance varying switches 16 to 19 inclusive, a series-parallel switch 20, and a main reversing switch 21. The switches 15 to 19 are each provided with a blow-out coil 22 and may be operated by means of solenoids 23 to 27 inclusive. One terminal of the solenoid 23 is connected to a point 28 between the operating solenoids 29 and 30 of the series-parallel switch 20. One terminal of each of the solenoids 24 to 27 is grounded. The remaining terminals of the solenoids 23 to 27 are connected to the train wires $i$, $h$, $g$, $f$ and $e$ respectively. The switches 16 to 19 when closed cut out of circuit the resistance sections 31 to 34 respectively.

The series-parallel switch 20 is normally in the position in which it is shown and returns to such position when its associated magnets are all deënergized. The operating magnets 29 and 30 of this switch when energized move the switch into contact with its two sets of contacts $p$ and $s$ respectively, as shown in Figs. 1 and 5. One terminal of each of the coils 29 and 30 is connected to the point 28 while the other terminals of these two coils are connected to the train wires $d$ and $c$ respectively. Besides the operating coils 29 and 30, the series-parallel switch is provided with two holding coils 35 and 36. The coil 35 is energized when the switch 20 is in its parallel position, engaging contacts $p$, in which position it holds said switch until the motor circuit is broken elsewhere. The coil 36 is energized when the switch 20 is in its series position, engaging contacts $s$, in which position it holds said switch until the motor circuit is interrupted at some other point. This series-parallel switch has but one movable member 37 carrying two bridging contacts 38 and 39, which are insulated from each other as indicated. The member 37 hangs normally in a vertical position, as best shown in Fig. 5, but can be moved to one side or the other according as the coil 29 or 30 is energized. This series-parallel switch is preferably inclosed by a casing 40, as shown in Fig. 5.

The main reversing switch 21 comprises two sets of segments 41 and 42, and 43 and 44, mounted upon a common shaft 45. This shaft is preferably squared at the place where the segments are mounted, as best shown in Fig. 7. The segments 41 to 44 are insulated from each other and from the shaft 45. These segments coöperate with contact fingers 46, connected as shown in Fig. 1. An arm 47, fixed on the shaft 45 and operatively connected to the cores of the solenoids 48 and 49, allows said reversing switch to be moved by said solenoids through an angle of 90° to reverse the connections of the motor field windings $F^1$ and $F^2$. One terminal of each of the solenoids 48 and 49 is grounded while the other terminals of these two solenoids are connected to the train wires $b$ and $a$ respectively. The main reversing switch 21 will remain in either position in which it is placed, thus rendering it unnecessary to continuously energize its operating solenoids 48 and 49.

The master reversing switch 13 is arranged to take advantage of this. This switch, which is of the drum type, has two bridging contacts 50 and 51 as shown. These two contacts are mounted on the drum 13 as shown in Figs. 2 to 4 inclusive. On the shaft 52 of this drum is also mounted a notch plate 53 which coöperates with a spring-pressed pawl or roller 54. An arm 55 extends from the notch plate 53 and is connected to the plunger of a dash-pot 57. This dash-pot, here shown as an air dash-pot, is provided with slots 58, to allow unretarded motion of the dash-pot piston and connected parts while said piston is near the central part of the dash-pot. These slots however do not extend entirely to the end of the dash-pot so that they do not prevent the retarding effect of the dash-pot when the piston is near either end thereof. The dash-pot is also provided with valves 59 and 60, which are biased to closed position but open when the piston 56 approaches the end of the dash-pot at which they are located, thus allowing this movement of the piston to be unhindered. These valves, however, close as the piston is moved away from their respective ends of the dash-pot, so that as it moves toward its central position the dash-pot will retard its connected parts until the piston reaches the slots 58. The arm 55 has no tendency to movement when the master reversing switch is in its neutral position N, as shown in Fig. 2, or in the indicating positions for forward or backward movement, F' and B' respectively, as shown in Fig. 3. As this switch, however, is moved to its operative forward or backward positions F or B, the arm 55 compresses one or the other of springs 61 and 62, and consequently when the handle 63 is released by the operator when the controller is in either of its operative positions, say position F, the spring 61 expanding moves the reversing switch from its operative position F to its corresponding indicating position F'. During the first part of this movement, while the bridging contact 50 remains in engagement with its coöperating contact finger, the movement is retarded by the dash-pot 57. Just as the contact 50 and its coöperating contact fingers are about to separate, the dash-pot piston 56 reaches the slots 58 and the retarding action of the dash-pot ceases, so that the contacts of this master reversing switch are able to break engagement with a snap action. The drum 13 is stopped in the position F', as shown in Fig. 3, to indicate in which direction it has just been closed. This stopping is effected by the spring-pressed pawl 54, coöperating with the notch plate 53, and also because the spring 61 ceases to act at this point.

The motor circuit on each car is supplied from a trolley T through a manual switch 64 and a solenoid coil 65. The controlling circuit on each car is taken as a shunt from the main circuit through the manual switch 66 and the arm 67 of an automatic circuit-breaker. This circuit-breaker may be of any desired type and is here shown as being spring-pressed to either on or off position by a spring 68. The operating coil of this circuit-breaker is the coil 65 in the main motor circuit. Should an overload occur the coil 65 will trip the circuit-breaker 67 and open the controlling circuit, which in turn will cause all the switches 15 to 20 to open and cause the arcing due to opening the main circuit to be taken by the switch 15, where provision is made for taking care of it. The current in the controlling circuit being comparatively light no blow-out arrangement is generally necessary at the circuit-breaker 67 though a blow-out coil may be provided if desired.

At some accessible place around the car, preferably below the floor of the car between the two trucks if the car is a double truck car, a supporting plate 69 is placed. Upon this plate are placed the cut-out switches 70, 71 and 72 and the fuses 73, 74 and 75. The switches 70 and 71 are connected to operate together and when open cut out the motor $A^1$. The switch 72 when open cuts out the motor $A^2$. The fuses 73, 74 and 75 are mounted directly above the switches 70, 71 and 72 respectively or in some other indicating relation thereto, and are in series therewith. Should an overload occur on one of the motors only or should a short-circuit take place in the windings of such motor, the fuse or fuses associated with that motor will blow and automatically cut that motor out of circuit. The other motor may still be used in the parallel position of the controller. By having the switches and fuses in indicating proximity to each other the motorman or other operator may determine at a glance which motor sustained the overload and therefore which cut-out switch should be opened. The fuses 73, 74 and 75 are preferably arranged to blow at a smaller current than is required to trip the circuit-breaker 67.

The operation of the system is as follows: The switch 64 is closed on all the cars of the train. The circuit-breaker 67 and the manual switch 66 are closed for the master controller which is to be used to control the train. The operator moves his master reversing switch 13 to its proper position F or B as the case may be, and releases it. If forward movement is desired the switch 13 is moved to position F, completing the circuit from the trolley to the train wire $b$ and thence through the coil 48 of the main reversing switch of each car to ground. This circuit is broken at the switch 13 after a predetermined time by the action of the spring 61 retarded by the dash-pot 57 as explained above. Should backward movement have been desired, the master reversing switch would have been moved to position B and would have completed the circuit from the trolley to the train wire $a$ and thence to the coil 49 of the main reversing switch on each car. In either case the spring 61 or 62 will move the master reversing switch to the proper indicating position after a predetermined time after said switch has been released by the operator. The main reversing switches of all the cars are now in the same position, say the forward position as shown in Fig. 1.

The main controlling drum 1 of the master controller is now moved to position 1. This completes a circuit from the trolley to the train wire $c$ and thence on each car through the coil 30 of the series-parallel switch to move said switch to its series position $s$ and the coil 23 of switch 15 to close said switch and complete the motor circuit. The controlling circuit is completed from the coil 23 through the train wire $i$ and the master controller to ground. The operation of the series-parallel switch 20 and the circuit-closing switch 15 is the same on each car of the train. When the master controller is moved to position 2 the connection from the train wire $i$ directly to ground is broken and said wire is connected to ground through the solenoid 24 on each car, said solenoid closing the switch 16 to cut out the first section 31 of the resistance. In positions 3, 4 and 5 the solenoids 25, 26 and 27 are respectively energized thus cutting out the resistance sections 32, 33 and 34, and the solenoids 24, 25 and 26 deënergized, thus saving the energy which would be expended in them. If the master controller is moved from position 5 to position 6 the resistance sections 31 to 34 are cut into circuit again and the switches 15 and 20 successively opened. This successive opening is due to the fact that the switch 20 is held in series position by the coil 36 after the coil 30 has been deënergized until the main circuit is opened at the switch 15. Then, after the master controller passes a position midway between positions 5 and 6, the coils 23 and 29 are simultaneously energized and simultaneously close the switches 15 to 20, the latter in its parallel position. When the master controlling switch reaches position 6 the switch 16 is also closed to cut out resistance section 31. In positions 7, 8 and 9 of the master controller the resistance sections 32, 33 and 34 are cut out by the operation of the switches 17, 18 and 19 respectively, the motors $A^1$ and $A^2$ during this time being connected in parallel.

From position 9 the controller may be arranged to move either backward or forward to off position as desired. In either case it breaks the controlling circuit during this movement to off position, and may or may not complete said circuit again. By breaking the controlling circuit the coils 23 and 29 are simultaneously deënergized but the coil 35 holds the series-parallel switch closed until after the motor circuit has been broken at the switch 15. The coils 35 and 36 are arranged to be energized only when the series-parallel switch is in its parallel and series positions respectively. By having these holding coils it is possible to prevent any arcing at this switch and causing all of the arcing to take place at the circuit-closing switch 15, where provision is made for extinguishing it. The switches 15 and 20 thus close simultaneously and open successively.

Should one of the motors on any car be short-circuited or overloaded in any way, the fuses in the circuit of that motor will blow automatically and cut out that motor from circuit while enabling the motors on the other cars and the remaining motor or motors on that car to continue to operate, at least in the parallel positions of the master controller. It is preferable however that the motorman or other operator should immediately disconnect the disabled motor by means of the proper cut-out switch, this cut-out switch being positively indicated by its proximity to the fuse which has blown.

The operation of the circuit-breaker 67 has been explained hereinabove.

Many modifications in the precise arrangements here shown and described will be obvious to any one skilled in the art and all such modifications which come within the spirit and scope I aim to cover in the following claims.

What I claim as new and desire to secure by Letters Patent is:—

1. In a system of motor control, a plurality of motors, a switch for connecting said motors in different relations, a second switch for closing the motor circuit, remotely controlled means for closing said switches simultaneously, and means for holding the first switch closed until the second switch has been opened.

2. In a system of motor control, a plurality of motors, a switch for connecting said motors in series and in parallel, a second switch for closing the motor circuit, remotely controlled means for closing said switches simultaneously, and means for holding the first switch closed until the motor circuit is broken.

3. In a system of motor control, a plurality of motors, a switch for connecting said motors in various relations, a plurality of independent actuating means for respectively moving said switch into its different positions, a second switch for closing the motor circuit, actuating means for closing said second switch, and means for causing the simultaneous operation of the actuating means of the second switch and any one of the actuating means of the first switch.

4. In a system of motor control, a plurality of motors, a switch for connecting said motors in various relations, a plurality of independent actuating means for respectively moving said switch into its different positions, a second switch for closing the motor circuit, actuating means for closing said second switch, means for causing the simultaneous operation of the actuating means of the second switch and any one of the actuating means of the first switch, and means for holding said first switch closed until the second switch has opened.

5. In a system of motor control, a plurality of motors, a switch for connecting said motors in series and in parallel, actuating means for moving said switch into its different positions, a second switch for closing the motor circuit, actuating means for closing said second switch, means for causing the simultaneous operation of the actuating means of the two switches, and means for holding said first switch closed until the motor circuit is broken.

6. In a system of motor control, a plurality of motors, a switch for connecting said motors in various relations, actuating means for moving said switch into its different positions, a second switch for closing the motor circuit, actuating means for closing said second switch, means for causing the simultaneous operation of the actuating means of the two switches, and magnets for holding said first switch closed until the second switch is opened.

7. In a system of motor control, a plurality of motors, a switch for connecting said motors in series and in parallel, a plurality of independent actuating means for respectively moving said switch into its different positions, a second switch for closing the motor circuit, actuating means for closing said second switch, means for causing the simultaneous operation of the actuating means of the second switch and either of the actuating means of the first switch, and magnets for holding said first switch closed until the motor circuit is broken.

8. In a system of motor control, a plurality of motors, a switch for connecting said motors in various relations, actuating means for moving said switch into its different positions, a second switch for closing the motor circuit, actuating means for closing said second switch, means for causing the simultaneous operation of the actuating means of the two switches, and a magnet for holding said first switch closed until the motor circuit is broken.

9. In a system of motor control, a plurality of motors, a switch for connecting said motors in series and in parallel, a plurality of independent actuating means for respectively moving said switch into its different positions, a second switch for closing the motor circuit, actuating means for closing said second switch, means for causing the simultaneous operation of the actuating means of the second switch and either of the actuating means of the first switch, and a magnet for holding said first switch closed until said second switch is opened.

10. In a system of motor control, a plurality of motors, a switch for connecting said motors in series and in parallel, a plurality of independent actuating means for respectively moving said switch into its different positions, a second switch for closing the motor circuit, actuating means for closing said second switch, means for causing the simultaneous operation of the actuating means of the second switch and any one of the actuating means of the first switch, and magnets respectively energized when said first switch is closed in its various positions for holding said first switch in said position until said second switch is opened.

11. In a system of motor control, a plurality of motors, a switch for connecting said motors in various relations, independent actuating means for moving said switch into its different positions, a second switch for closing the motor circuit, actuating means for closing said second switch, means for causing the simultaneous operation of the actuating means of the two switches, and magnets respectively energized when said first switch is closed in its different positions for holding said first switch in said position until the motor circuit is interrupted.

12. In combination, a plurality of separate switches in series, and means whereby said switches are closed simultaneously and opened successively.

13. In combination, a plurality of switches in series, magnets arranged to close said switches simultaneously, and means for holding one of said switches closed until another has opened.

14. In a system of control, a plurality of switches in series, and remotely controlled means for causing said switches to close simultaneously and open successively.

15. In a system of control, a controlled circuit, a plurality of switches in said circuit, remotely controlled means for closing said switches simultaneously, and means for holding one of said switches closed until the other has been opened.

16. In a system of control, a controlled circuit, a plurality of switches in said circuit, remotely controlled means for closing said switches simultaneously, and means for holding one of said switches closed until the controlled circuit has been broken.

17. In a system of control, a controlled circuit, a plurality of switches in said circuit, a plurality of magnets connected in series for respectively closing said switches, and a magnet in the controlled circuit for holding one of said switches closed until said controlled circuit is broken.

18. In a system of control, a plurality of switches in series, magnets for closing said switches, and means for causing the simultaneous operation of said magnets, and for holding one of said switches closed until the other has been opened.

19. In a system of control, a plurality of switches in series, magnets for closing said switches, means for causing the simultaneous operation of said magnets, and a solenoid arranged to hold one of said switches closed until the circuit through the other has been opened.

20. In a system of motor control, a motor, a reversing switch for said motor, said switch being arranged to remain in either operative position, and a master controlling switch for controlling said reversing switch, said master controlling switch being biased to open position.

21. In a system of motor control, a motor, a main reversing switch for said motor, said switch being arranged to remain in either operative position, and a master reverser for said main reversing switch, said master reverser being arranged to cause the operation of the main reversing switch in either direction but to deënergize the actuating means for said main reversing switch a predetermined time after the master reverser is released by the operator.

22. In a system of motor control, a motor, a main reversing switch for said motor, and a master reverser for controlling the main reversing switch, said master reverser having indicating and operating positions for each position of the main reversing switch and being biased when in an operating position to the corresponding indicating position.

23. In a system of motor control, a motor, an electrically operated main reversing switch therefor, and a master reversing switch for controlling the operating means of said main reversing switch, said master reversing switch having indicating and operating positions for each position of the main reversing switch and being biased when in an operating position to the corresponding indicating position.

In testimony whereof I affix my signature, in the presence of two witnesses.

EMMETT W. STULL.

Witnesses:
 GEO. B. SCHLEY,
 FRED J. KINSEY